Aug. 12, 1941.  R. ALKAN  2,252,338
GYROMAGNETIC COMPASS
Filed July 15, 1936  3 Sheets-Sheet 2
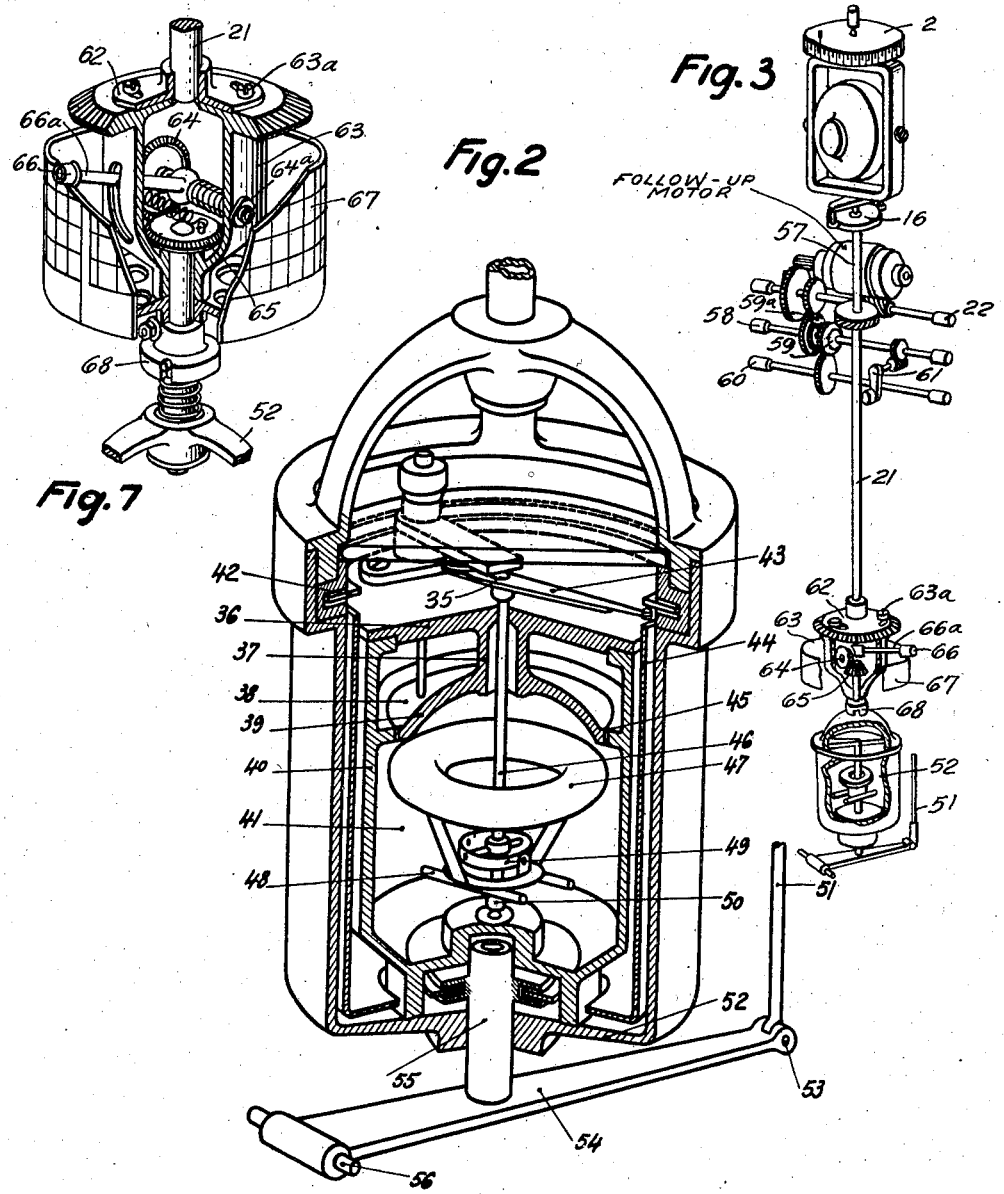
INVENTOR:
Robert Alkan,
By Chadwick Company
Attys Aug. 12, 1941.   R. ALKAN   2,252,338
GYROMAGNETIC COMPASS
Filed July 15, 1936   3 Sheets-Sheet 3
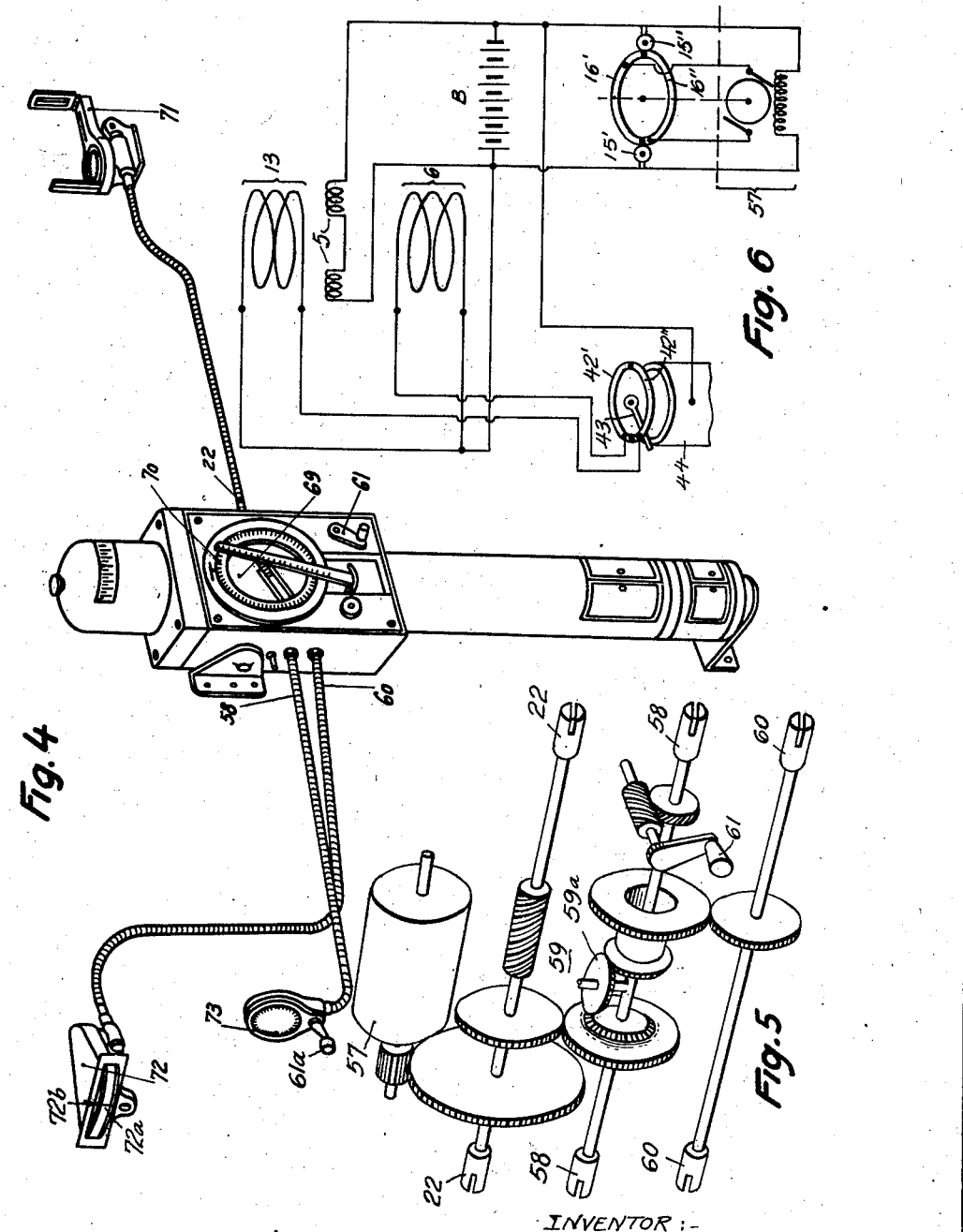

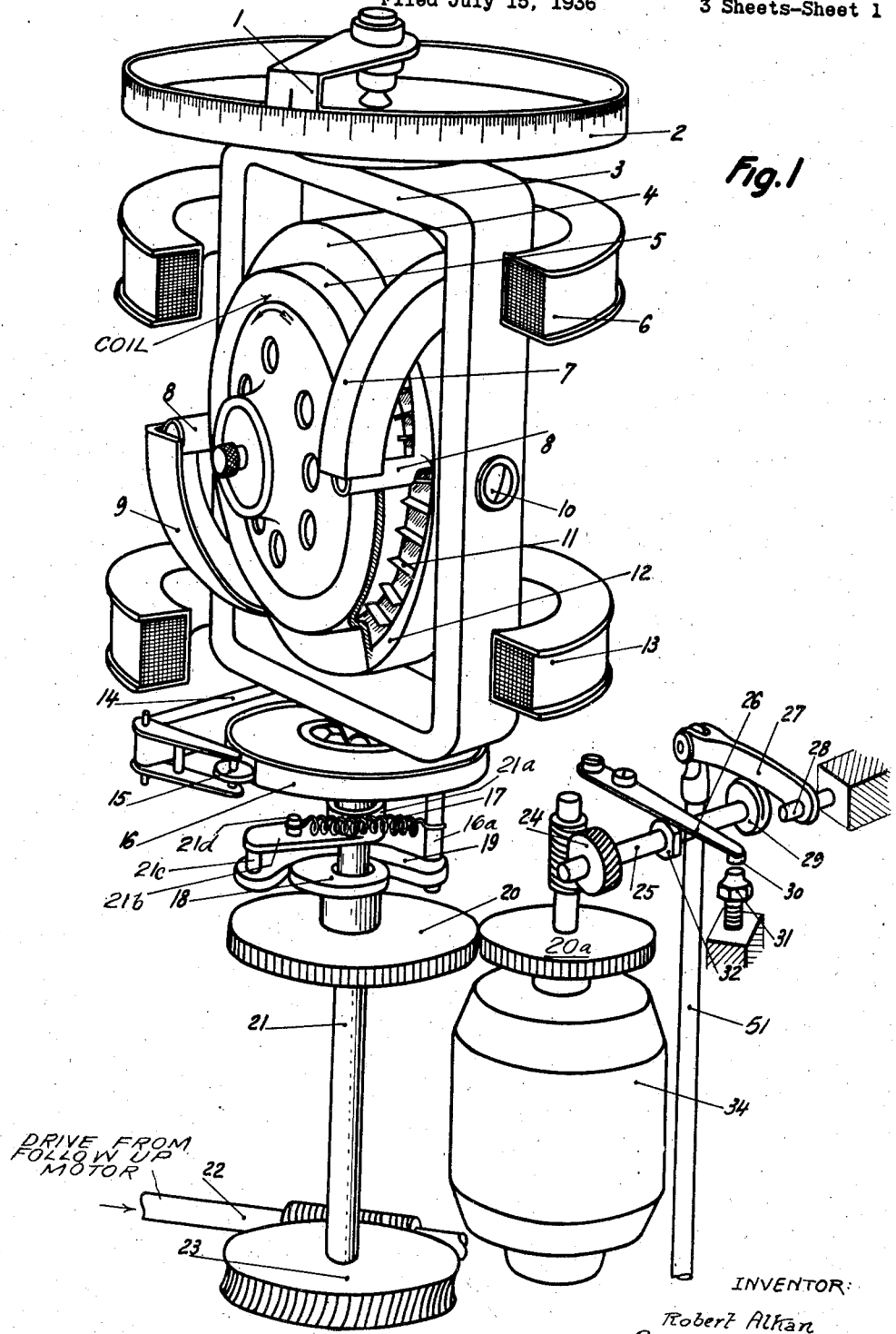

Patented Aug. 12, 1941

2,252,338

UNITED STATES PATENT OFFICE 2,252,338

GYROMAGNETIC COMPASS

Robert Alkan, Paris, France

Application July 15, 1936, Serial No. 90,669
In France July 30, 1935

27 Claims. (Cl. 33—223)

The present invention relates to gyro-magnetic compasses of the type comprising a directional gyroscope having three degrees of freedom and controlled by a magnetic compass, and more particularly to novel means for controlling the gyroscope from the compass.

One of the objects of the invention is to provide, in combination with a gyroscope having three degrees of freedom, novel means for causing precessional movements of the gyroscope about one axis of freedom by applying a torque to the gyroscope about another axis of freedom perpendicular to said first axis.

Another object is to provide a gyro-magnetic compass of an improved type which will be particularly suitable or adapted for piloting aircraft and one in which the quality and certainty of the indications thereof are largely improved.

In accordance with the present invention there is provided a gyro-magnetic compass in which a neutral three-degrees-of-freedom gyroscope is provided with power means for correcting its azimuthal indicating position, said power means being controlled in its application to the gyroscope by means of a magnetic compass in such a manner that the gyroscope is constrained to the average indication position of the compass, thereby enabling the gyroscope to carry the indicating compass card with the ensuing advantage that the card is stabilized against temporary oscillations such as would be caused by abrupt turns and accelerations in the case of a card carried by the magnet system of the compass.

The above and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for purposes of illustration only and are not to be construed as defining the limits of the invention, reference being had for this purpose to the appended claims.

In the drawings, wherein like reference characters refer to like parts throughout the several views:

Fig. 1 is a perspective view showing certain of the elements constituting the gyroscope portion and the control therefor embodying the invention.

Fig. 2 is another perspective view, partly in section, showing the elements of one form of magnetic compass employed to control the gyroscope in accordance with the invention.

Fig. 3 is another perspective view of the gyroscope in combination with the compass and showing the manner in which the gyroscope and compass are assembled and also the transmission system between the gyroscope and the compass;

Fig. 4 is a perspective view of a complete installation of a gyro-magnetic compass embodying the invention;

Fig. 5 is a perspective view illustrating in detail the setting mechanism of Fig. 4;

Fig. 6 is a diagrammatic view illustrating the electrical circuits by which the gyroscope is controlled from the magnetic compass; and Fig. 7 is a detailed view of the deviation compensating elements of the apparatus shown in Fig. 3.

Referring to the drawings and more particularly to Fig. 1, the gyro casing 4 is mounted in a gimbal frame 3 for angular movement about a horizontal axis one end of which is shown at 10.

A phantom disc 16 carrying a pair of semi-circular contacts 16' and 16" (see Fig. 6) separated by electrical insulation is mounted axially of the frame 3 for relative rotative movement with respect to said frame. A pair of arms 14, only one of which is seen in Fig. 1, are mounted on frame 3 and carry at their extremities the rollers 15' and 15" which cooperate with the semi-circular contacts 16' and 16" of the phantom disc 16.

The follow-up motor 57 (not shown in Fig. 1) drives the worm shaft 22 whereby the worm wheel 23 and shaft 21 are rotated in one direction or the other, depending upon the direction of relative movement of the phantom disc 16 and the frame 3.

Means are provided for connecting the shaft 21 to the phantom disc 16 whereby said phantom may be rotated upon rotation of shaft 21 and whereby said phantom is continuously oscillated about shaft 21 as a center. In the illustrated embodiment said means comprise, as shown, a collar 21a mounted on the upper extremity of shaft 21 and carrying integrally therewith the arm 21b. Pin 21c pivotally connects a curved lever 19 at one end thereof to said arm 21b, the other end of said lever abutting the rod 16a mounted on the phantom 16. Spring 17 is connected to rod 16a and to a pin 21d mounted on arm 21b whereby the rod 16a is held in resilient abutting relation to the lever 19.

A cam 18 abuts the lever arm 19 and is integral with gear 20 which is movably mounted on shaft 21 for rotation with respect thereto. A motor 34 drives the gear 20a which meshes with gear 20 to rotate cam 18 against the resilient opposition of lever 19 whereby the phantom 16 is oscillated at a frequency determined by the speed of motor 34 and the relative diameters of gears 20a and 20. This frequency may be chosen as desired.

The oscillation of disc 16 controls an electrical circuit as shown in Fig. 6 and causes a series of current impulses to be transmitted in alternate directions to the follow-up motor. The average values of these impulses is zero when there is no relative movement between the gyro and shaft 21, but upon relative movement the average value of said impulses produces a current in one direction or the other, the value of which is dependent upon the amount of said relative movement, and the direction of which depends upon the direction of said relative movement.

The gyroscope is mounted so as to be completely free of any mechanical connections to the remainder of the instrument, the only connection between the gyro and the remainder of the apparatus being by power means which will be described in detail hereinafter. A compass card 2 is mounted on the gyro frame 3 for rotation therewith and cooperates with the index 1 mounted in stationary position on the supporting frame or casing of the instrument.

In order to stabilize the gyroscope so that it will not oscillate too much in its azimuth indications, the following arrangement is used:

The outer rim or periphery of the gyroscope is provided with wings or fins 11 forming a centrifugal fan for the air which is introduced through holes formed in the gyro casing. The air is caused to escape through two nozzles or pipes 8 arranged perpendicular to the plane of the fan. To drive the air toward these nozzles there are provided in the casing 4 of the gyroscope two frames 12 similar to that which normally surround centrifugal fans, but these two frames extend over a half circumference, after commencing at one of the nozzles and ending at the other nozzle on the diagrammatically opposite side. A suspension frame 3 of the gyroscope is provided with two semi-circular screens 7 and 9 disposed in such a manner that they can in turn close off, at least partially, each of the two nozzles 8. These screens are cut along a plane perpendicular to the axis of rotation (azimuthal axis) of the frame 3 in such a manner that in a tilted condition of the gyroscope one of the nozzles is uncovered while the other is covered or hidden behind the corresponding screen. When the gyroscope rotates in the direction indicated by the arrow thereon, there results from this arrangement a tendency for the gyroscope to turn about its horizontal axis 10 in such a manner as to bring back the nozzle into its original position. In this manner the spin axis of the gyroscope is maintained in a horizontal plane and is not deviated therefrom by horizontal acceleration forces as would be the case if the gyroscope were stabilized by a pendulous device.

In order to be able to correct undesirable or accidental deviation of the gyroscope from its initial azimuth direction, the gyroscope is provided with suitable means for modifying its azimuth position while maintaining equilibrium. For this purpose there is arranged on its casing concentrically with the axis of rotation of the gyro rotor a solenoid consisting of a coil 5 divided into two flat parts disposed symmetrically on either side of the gyro casing, only one such part being visible in Fig. 1 of the drawings. This coil may be energized at the same time and by the same current used to energize the gyroscope motor through its suspension gimbals in a manner similar to that described in the patent to Friedrich Lauck No. 2,209,735, dated July 30, 1940. There is disposed concentrically with the vertical axis of rotation of the frame 3 another solenoid formed, for example, of two coils 6 and 13 placed symmetrically with respect to the coils 5 and in parallel planes perpendicular to the planes of said coils 5. The two coils 6 and 13 are stationary and, therefore, may be fixed to the dome-shaped instrument casing shown on the top of the rectangular box of the apparatus illustrated in Fig. 4. By sending an electric current through the stationary solenoid coils 6 and 13 there is produced in movable solenoid coils 5 an electro-dynamic couple about the horizontal axis 10 of the gyroscope to cause an azimuthal precession of the gyroscope about its vertical axis.

Referring to Fig. 2, wherein the structure of the compass is illustrated, said compass comprises a bowl 40 which contains the damping liquid and which is divided into two compartments 38 and 41 by means of a diaphragm 39 carried by a tubular projection extending downwardly from the cover 36. An annular slit 45 is provided between the diaphragm 39 and the wall of the bowl in order to provide free access for the damping liquid but to prevent the ripples on the free surface of the reserve liquid contained in the upper compartment 38 being communicated to any appreciable extent to the liquid in the lower compartment 41 where the movable magnet system of the compass is located.

The movable magnet system of the compass comprises, as shown, a pair of magnets 48 secured to an annular float 47 which is connected to a vertical shaft 46 by means of a Cardan suspension 49. The center of movement of the Cardan suspension is disposed below the center of gravity of the float 47 in order to obtain hydrostatic stability of the magnet system in order to maintain the magnets in a horizontal plane at all times regardless of any inclination of the bowl.

The vertical shaft 46 is mounted in two bearings 50 and 35, the lower bearing 50 being in the damping liquid and the upper bearing 35 being outside of the bowl and clear of the liquid, the shaft 46 projecting through the tubular member 37 and cover 36 for this purpose. The tubular passage 37 is of small diameter in order that the surface contact between the liquid and the air will be small and will reduce evaporation and ripples to a minimum.

Advantage is taken of the possibilities offered by such a structural arrangement to prevent contact arm 43 from being immersed in the damping liquid, said arm being attached to the upper end of shaft 46.

In order that the magnetic compass may control the electric current used to energize the stationary coils 6 and 13 to correct the azimuth position of the gyroscope as explained hereinbefore, there is provided around the bowl 40 a concentric cylinder 44 which is periodically actuated in an axial direction by means of a push rod or member 55 sliding in the bottom of the casing 52 of the magnetic compass. The movable cylinder 44 is mounted on the push rod 55 by means of an opening formed centrally of a supporting member on which the bowl 40 rests at the bottom of the casing 52.

Means are provided for actuating the cylinder 44 in the manner indicated above and for this purpose the push rod 55 is made to rest on a lever 54 pivoted at 56 on a fixed point of the frame of the instrument and pivotally connected at 53 to the lower part of a rod 51 the upper end of which is shown in Fig. 1. The rod 51 is pivotally connected to the lever 27 which in turn is pivoted at a fixed point 28 and actuated by a cam 29 secured to a shaft 25 connected by a worm gear 24 to the auxiliary motor 34, which has been previously referred to herein.

When the cylinder 44 moves upwardly it brings the flexible end of the indicator needle 43 beneath a ring 42 comprising an electric rail formed of two semi-circular insulated conductors 42' and 42" separated from each other by insulation (Fig. 6).

At the moment when the contact arm 43 is gripped between the cylinder 44 and one of the conductors of ring 42 it effects an electrical contact between the cylinder and one or the other of the semi-circular conductors.

Referring to Fig. 6 wherein the electrical circuits of the apparatus are illustrated, the coil 6 is shown on one side of the coils 5 and coil 13 shown on the other side of said coils 5. The coil 6 has one end thereof connected to the battery B and its other end connected to the semi-circular conductor 42', while the coil 13 also has one end thereof connected to the battery B and its other end connected to the semi-circular conductor 42". Thus, when the relative position of the contact arm 43 and the compass casing is such as shown in Fig. 6, reciprocation of cylinder 44 forces needle 43 into contact with conductor 42". Current then passes from one side of battery B through the coil 13 and back to the other side of the battery through conducting segment 42', arm 43 and cylinder 44, thereby producing a field in one direction coacting with the field of the two parts of coil 5 whereby the gyro is precessed in one direction to produce alignment of the gyro and compass needle.

When the arm 43 and the compass casing are in such relative positions that arm 43 is beneath conductor 42', reciprocation of cylinder 44 causes a current to flow through coil 6 whereby a field is produced in a direction opposite to that produced by the coil 13 until the gyro and the compass needle are in alignment.

By utilization of two fixed coils 6 and 13 spaced apart as illustrated in Fig. 1, a more uniform disposition of the lines of force parallel to and concentric with the vertical axis of the gyro is produced while the use of the two-part coil 5 produces a more uniform field parallel to and concentric with the axis of rotation of the gyro.

To avoid deterioration of the parts forming the electric contacts, the bearing surfaces are lined with metal which does not oxidize readily, such as platinum or tungsten, for example. Still better results may be obtained by interposing an electric circuit with an interrupter formed of a resilient arm 26 (Fig. 1) provided with a movable contact 30 which rests on a fixed contact 31 but which periodically moves away therefrom under the influence of a cam 32 integral with the same shaft 25 which carries the cam 29 for raising the cylinder 44. The forms of these cams are established in such a manner that the contact between the contacts 30 and 31 will be established only after the gripping of the arm 43 occurs and will be broken before the arm is free again. The energization of the coils 6 and 13 and the interruption of the current will therefore take place only through the contacts 30 and 31 and not through the contact surfaces of the arm 43, the part 42 and the cylinder 44, which will remain undisturbed.

The reduction gear 24 is so arranged and the speed of the motor is regulated in such a manner that the time during which the arm 43 remains free to move between two engagements thereof by the drum 44 shall be approximately of a duration of a quarter of a period or an uneven multiple of a quarter of a period of the free oscillation of the magnetic compass. The result will be that when the arm 43 is released from its position of equilibrium it will be held again by the next engagement thereof by the drum 44 at a moment when it is in the neighborhood of its position of equilibrium. In this manner there is obtained an effective dampening action which will be added to that already produced by the immersion of the movable magnet system of the compass in the liquid contained in the compass bowl. In order that the relative orientation of the gyroscope shall closely approximate that of the casing of the magnetic compass in spite of movements of the aircraft in the horizontal plane, the casing of the magnetic compass is connected to the phantom disc 16 of the gyroscope by means of an extension of the vertical shaft 21 by assembling these various elements in the manner shown diagrammatically in Fig. 3.

Motor 51 drives the vertical shaft 21 through the shaft of the worm 22 to actuate a mechanical magnetic deviation compensating device for the magnetic compass which will now be described.

Referring to Figs. 3 and 7, shaft 21 is shown as carrying at its end a slotted plate 62 whereby relative adjustment may be made between shaft 21 and the compass casing 52 in accordance with the magnetic declination. A frame 63 is connected to plate 62 by connections 63a to rotatably support the casing 52 axially with the shaft 21 whereby shaft 21, plate 62, frame 63 and casing 52 rotate as a unit. Means are provided whereby the casing 52 and the shaft 21 are automatically relatively rotated an amount proportional to the magnetic deviation to produce automatic compensation for such magnetic deviation. In the form shown, said means comprise a pair of coacting bevel gears 64 and 65, gear 64 being mounted for rotation with the shaft 64a journaled in frame 63. A lever 66a is fixedly mounted on the shaft 64a at right angles thereto and carries at one end thereof the cam follower 66 coacting with cam 67, the latter cam being designed in accordance with the values of the magnetic deviation.

Bevel gear 65 is fastened to shaft 68 for rotation thereof upon rotation of gears 64 and 65.

As shaft 21 is rotated, plate 62 and frame 63 rotate therewith. Rotation of frame 63 causes bodily rotation of shaft 64a and lever 66a so that said lever is moved up and down by the coaction between the cam follower 66 and cam 67. This up and down motion of lever 66a rotates shaft 64a about its own axis to thereby rotate bevel gear 64 which, in turn, rotates bevel gear 65 to rotate the shaft 68 and casing 52. It is seen, therefore, that not only is casing 52 rotated with shaft 21 but the relative position of shaft 21 and casing 52 is changed during such rotation, said change being in accordance with the magnetic deviation, whereby said deviation is compensated so that the compass card 2 is maintained in a position which is unaffected by the magnetic deviation because of the modification of the electrical forces exerted by means of coils 6 and 13 under the control of the magnetic compass and its casing.

Means are provided for producing a remote indication and for this purpose the worm shaft 22 (Figs. 4 and 5) is connected to shaft 60 through a differential gear train 59 having a gear 59 which is carried by an intermediate shaft adapted to be rotated by means of handles 61 or 61a or by means of an auxiliary motor. The intermediate shaft 58 is also connected to a route indicating plate 69 secured to the outside of the casing containing the gear mechanism in such a manner that one complete rotation of the plate 69 corresponds exactly to one complete rotation of the vertical shaft 21.

Shaft 60 is connected to a remote indicator 72 whereby the desired change in course is indicated to the pilot. Shaft 60 may be rotated either by crank 61, as shown in Figs. 3 and 4, or by crank 61a remote from the main route plate 69. When the crank 61a is rotated, the amount of the change in the course desired is indicated by the instrument 73. When the course change is set from the handle 61, the amount of change may be indicated on the route plate 69. Let it be assumed that the navigator wishes the pilot to change the course by a definite amount. If the navigator is located at the position of the instrument 73, the crank 61a is rotated until a desired change in the course is indicated upon the instrument 73. This change is transmitted to instrument 72 by means of shaft 60. The pilot reads the desired change in course on instrument 72 which change is indicated by the shift of the movable index 72a away from the stationary index mark 72b on said instrument. The controls of the aircraft are then operated by the pilot to change the course to that indicated. As the course changes, shaft 21 is rotated by motor 57 to maintain the casing of the compass in the same position relative to the position of the gyro. Simultaneously with the rotation of shaft 21, the shaft 22 is rotated whereby the actual course is indicated on instrument 71 (Fig. 4). As the craft is turned and the shaft 21 is being turned, the differential gear train 59 (Fig. 5) rotates shaft 60 whereby the movable index 72a of instrument 72 is rotated back so that said movable index 72a and the stationary index 72b approach each other. When these indices 72a and 72b are in alignment the craft is on the new desired course.

There is thus provided an improved gyro-magnetic compass having many advantages over structures of the prior art, and includes novel means for controlling the directional gyroscope thereof from the magnetic compass employed in combination therewith.

Although only one embodiment of the invention has been illustrated and described, various changes and modifications in the form and relative arrangement of the parts, which will now appear to those skilled in the art, may be made without departing from the scope of the invention. Reference is therefore to be had to the appended claims for a definition of the limits of the invention.

What is claimed is:

1. A gyro-magnetic compass comprising an electrically driven neutral, three-degree-of-freedom gyroscope, electrical power means for correcting the azimuthal indication position of said gyroscope, a magnetic compass controlling the electrical power means in its application to the gyroscope, said gyroscope being constrained to the average indicating position of the compass, an indicating compass card carried by the gyroscope, said card being thereby stabilized against temporary oscillations, said power means including a solenoid mounted on the gyro casing and extending 360 degrees about one axis of freedom of the gyro, and a fixed coil at right angles to said first coil extending 360 degrees about another axis of freedom of said gyro whereby a uniform magnetic field is provided parallel to said other axis, means supplying electrical energy to said gyroscope and to said coil mounted on said casing, and means responsive to departure of said gyro and compass from a predetermined azimuthal relation whereby current is passed through said fixed coil to set up a field interacting with the field of said first coil to precess said gyro into said predetermined relation.

2. A gyro-magnetic compass comprising a neutral three-degree-of-freedom gyroscope, means mounting said gyroscope for free rotation about an axis thereof, power means for correcting the azimuthal indication position of said gyroscope, a magnetic compass, comprising a magnetic needle, a casing for said compass, a contact arm connected to and rotated by said magnetic needle a divided ring contact mounted on said casing in cooperative relation with said contact arm at all positions thereof, means for periodically moving said contact arm into conductive relation with said ring whereby an electrical circuit is closed through said power means, a contact-carrying disc, means movable with said gyroscope cooperating with said disc contacts, a second power means controlled by said movable means and contacts, a shaft controlled by said second power means, means adjustably connected to said shaft for rotation therewith, means suspending said casing from said adjustable means and mounted for rotation therewith, and cam means conforming to the magnetic deviation, cooperating with said adjustable means and said suspending means to modify the rotation of said casing in accordance with said magnetic deviation whereby the gyro indication is also compensated for magnetic deviations.

3. A gyro-magnetic compass comprising a neutral three-degree of freedom directional gyroscope, electrical power means for correcting the azimuthal indication of said gyroscope, a magnetic compass, means controlled by the relative deviations of said compass and gyroscope for controlling the energization of said power means, said means including means for periodically making and breaking a circuit through said power means whereby said gyroscope is constrained to the average indicating position of said compass.

4. A gyro-magnetic compass comprising a neutral three-degree of freedom directional gyroscope having a horizontal spin axis, electrical power means for correcting the azimuthal indication position of said gyroscope, a magnetic compass, said power means including a coil mounted on the gyro and extending 360 degrees about the spin axis of said gyro and a fixed coil extending 360 degrees about another horizontal axis of said gyro perpendicular to said spin axis and mounted independently of said gyro whereby a uniform magnetic field is provided parallel to said other axis, and means responsive to departure of said gyro and compass from a predetermined azimuthal relation for controlling the energization of said power means, whereby current is passed through said fixed coil to set up a field interacting with the field of said first coil to precess said gyro about a vertical axis into said predetermined relation.

5. A gyro-magnetic compass comprising a neutral three-degree of freedom gyroscope having a horizontal spin axis and a vertical precession axis, a magnetic compass, and means for producing a uniform magnetic field of force symmetrical with and parallel to the precession axis of said gyroscope, means on said gyroscope reacting with said magnetic field to produce a torque on said gyroscope about a second horizontal axis perpendicular to said spin axis, and means responsive to the departure of said gyro and compass from a predetermined azimuthal relation whereby said field is controlled to precess said gyro about said vertical axis into said predetermined relation.

6. A device of the character described comprising a free gyro, and means for exerting a corrective torque on said gyro comprising a stationary coil extending 360 degrees about an axis of said gyro whereby a uniform magnetic field is provided parallel to said axis, and means for controlling said magnetic field.

7. In a gyroscopic apparatus including a gyro mounted for three-degrees-of-freedom about three mutually perpendicular axes, means for exerting a corrective torque on said gyro comprising means extending 360 degrees about one of said axes for producing a uniform magnetic field symmetrical with and parallel to said axis, means on said gyro reacting with said magnetic field whereby said corrective torque is applied, and means for reversing the direction of said magnetic field.

8. In combination a gyroscopic apparatus including a free gyro, and means for exerting a corrective torque on said gyro comprising means for providing a uniform magnetic field symmetrical with and parallel to an axis of said gyro throughout 360 degrees about said axis.

9. In a gyroscopic apparatus including a gyro mounted for three-degrees-of-freedom, means for exerting a corrective torque on said gyro comprising a magnetic element mounted independently of said gyro and encircling the precession axis thereof, and means for controlling the magnetic field of said element.

10. In a gyroscopic apparatus including a gyro mounted for three-degrees-of-freedom, means for exerting a corrective torque on said gyro, comprising a magnetic element mounted independently of said gyro and encircling the precession axis of said gyro, and means for reversing the magnetic field of said element.

11. In a device of the character described, a gyro mounted for freedom about two mutually perpendicular axes, means producing a field of force coaxially with and uniformly distributed about one of said axes, and means for producing a second field of force coaxially with and uniformly distributed about the other of said axes, said second field reacting with said first field to produce a corrective torque on said gyro.

12. A gyro-magnetic compass comprising a normally free directional gyroscope, means for exerting a corrective torque thereon, a magnetic compass, and means controlled by a relative change in position of said compass and gyroscope in azimuth for controlling said torque means to correct the position of the gyroscope, said means including magnetic deviation compensating means automatically effective to produce modification of said correction in accordance with the magnetic deviation of said compass.

13. A gyro-magnetic compass comprising a normally free directional gyro, means for exerting a corrective torque on said gyro including a magnetic compass, means controlled by a relative change in position of said compass and gyro in azimuth for controlling said torque means to correct the position of the gyro, magnetic deviation compensating means including cam means conforming to the magnetic deviation of said compass, and means cooperating with said cam means to modify the correction of said gyro in accordance with said magnetic deviation.

14. In a device of the character described, a magnetic compass, a directional gyro, means controlled by a departure of the gyro from the position indicated by said compass for precessing said gyro into the position indicated by said compass, and means automatically varying said controlled means in accordance with the magnetic deviation of said compass whereby the azimuthal relation between compass and gyro is varied by an amount proportional to said magnetic deviation.

15. A magnetic compass comprising a casing, a liquid in said casing, a magnetic element, means for suspending said element in said liquid, said means including a float connected to said element, a circuit-closing arm, a shaft coaxial with said element and connected to said arm, and a Cardan ring suspension for connecting said magnetic element to said shaft, said ring being connected to said shaft below the center thrust of said float, whereby hygrostatic stability is obtained for any inclination of said casing.

16. A gyro-magnetic compass for an aircraft comprising a neutral three-degree-of-freedom gyro, a magnetic compass including a casing and a needle, means controlled by a departure of the gyro from the position indicated by said compass for precessing said gyro into the position indicated by said compass, means for rotating said compass casing upon relative movement of said gyro and craft whereby said casing maintains a desired position relative to said gyro, means movable upon rotation of said casing to indicate the heading of said craft, settable means including a differential connection to said indicating means, means controlled by the operation of said settable means to indicate a desired course, and means controlled by the operation of said indicating means and said differential to indicate when said course is achieved.

17. A neutral, three-degree-of-freedom directional gyroscope having a rotor and rotor-bearing frame, a substantially horizontal electro-magnetic coil extending 360° about said gyroscope, and magnetic means attached to and movable as a unit with said frame, said means setting up a field which interacts with a field set up by said coil, to apply a torque to said frame whereby the gyroscope is caused to precess in azimuth.

18. In a gyro instrument, a rotor, a part mounting said rotor for spinning about a first axis, a member mounting said part for pivotal movement about a second axis perpendicular to said spin axis, a support mounting said member, part and rotor for movement about a third axis normally perpendicular to said first and second axes, a solenoid surrounding said instrument substantially concentric of and perpendicular to said third axis, magnetic means fixed to said part for establishing a magnetic field at an agle to the field induced by said solenoid, whereby the two fields may interact to cause the gyro to precess about said third axis.

19. In a gyro instrument having three degrees of freedom, means for causing precession about one axis of freedom by means of torque exerted about another axis of freedom perpendicular to said first axis, comprising a coil surrounding the gyro for establishing a magnetic field substantially symmetrical to and concentric of the said one axis, and magnetic means on said instrument adapted to set up a field to interact with said first field for exerting torques in either direction about said second axis whereby the gyro is caused to precess about said one axis.

20. In a gyro-magnetic compass, a neutral three-degree-of-freedom directional gyroscope having a rotor and rotor-bearing casing, a substantially horizontal electro-magnetic coil extending 360° about said gyroscope, magnetic means attached to and movable as a unit with said casing, said means setting up a field which interacts with a field set up by said coil, a directional compass, a source of current, and circuit means controlled by said compass and including said coil, compass and source, whereby the coil is energized when the compass and gyroscope depart from a predetermined azimuthal relation to cause said gyroscope to precess in azimuth to restore said relation.

21. A course maintaining device for vehicles, comprising a directional element maintained in position by means responsive to the earth's magnetic field, a course member in cooperative relation with said directional element, means for relatively setting said course member and directional element in accordance with a predetermined course, means including a cam actuated member operative upon said setting to alter the relative set of said course member and said directional element so as to correct for the deviation of said directional element.

22. A course maintaining device for vehicles, comprising a directional element maintained in position by means responsive to the earth's magnetic field, a course member in cooperative relation with said directional element, means for relatively setting said course member and directional element in accordance with a predetermined course, a cam having a contour corresponding to the deviation of said responsive means at the different relative angular positions thereof and a member actuated by said cam as said course member and directional element are relatively set to modify said relative setting so as to correct for the deviation of said responsive means.

23. A course maintaining device for vehicles, comprising a directional member responsive to the earth's magnetic field, a course member in cooperative relation with said directional member, means for relatively setting said course member and directional member in accordance with a predetermined course, an element connected to one of said members and rotatable therewith upon operation of said setting means, a stationary cam having a contour corresponding to the deviation of said directional member at the different relatively angular positions thereof, and means carried by said element and actuated by said cam upon the rotation of said one member to alter said rotation so as to correct for the deviation of said directional member.

24. A course maintaining device for vehicles, comprising a directional member maintained in position by means responsive to the earth's magnetic field, a course member in cooperative relation with said directional member, means for relatively setting said course member and directional element in accordance with a predetermined course, an element connected to one of said members and rotatable therewith upon operation of said setting means, a stationary cam having a contour corresponding to the deviation of said responsive means at the different relative angular positions thereof, means carried by said element and actuated by said cam upon rotation of said one member to alter said rotation so as to correct for the deviation of said responsive means, and additional means to adjust the position of said element in accordance with the known variation of said responsive means.

25. In a gyro-magnetic compass, a compass element, a directional gyro, a shaft connected to said gyro to be controlled thereby in azimuth, a second shaft, variable means connecting said shafts for movement substantially in unison, a fixed cam disc acting upon said connecting means to vary the angular relation between said shafts in accordance with the magnet deviation of the compass element for each of its instantaneous azimuthal positions, and means responsive to a departure from a predetermined azimuthal relation of the compass and a definite radius of the second shaft for applying a torque to said gyro to cause the latter to precess and follow the compass in azimuth in a manner corrected for deviation.

26. A gyro-magnetic compass comprising a magnetic element, a directional gyro, a directional shaft controlled by said gyro, means responsive to the relative angular movement of said element and said gyro to control the precession of said gyro in accordance with the angular position of said compass whereby said shaft is maintained in an approximately definite angular relation with respect to said element, a member carried by said shaft, a stationary cam designed in accordance with the deviation of said element, means carried by said member and engaging said cam, and means controlled by said last means as the gyro precesses to vary the operation of said precession controlling means to thereby effect a corresponding correction in the angular position of said shaft to correct the deviation of said magnetic element.

27. A gyro-magnetic compass comprising a normally free directional gyroscope, means for exerting a corrective torque on said gyroscope, a magnetic compass, means controlled by a relative change in position of said compass and gyroscope in azimuth for controlling said torque means to correct the position of said gyroscope in azimuth, and magnetic deviation compensating means for modifying the correction of said gyroscope in accordance with the magnetic deviation of said compass.

ROBERT ALKAN.